United States Patent
Cheung et al.

(10) Patent No.: US 11,513,775 B2
(45) Date of Patent: Nov. 29, 2022

(54) GROUP CONTROL AND MANAGEMENT AMONG ELECTRONIC DEVICES

(71) Applicant: ABLE WORLD INTERNATIONAL LIMITED, British Virgin Islands (VG)

(72) Inventors: Wai-Tung Cheung, Hong Kong (HK); Chun-Hsiao Lin, New Taipei (TW); Shih-Cheng Lan, Taipei (TW); Ho-Cheung Cheung, Hong Kong (HK)

(73) Assignee: Able World International Limited, Tortola (VG)

( * ) Notice: Subject to any disclaimer, the term of this patent is extended or adjusted under 35 U.S.C. 154(b) by 513 days.

(21) Appl. No.: 15/318,842

(22) PCT Filed: Jun. 26, 2015

(86) PCT No.: PCT/CN2015/082502
§ 371 (c)(1),
(2) Date: Dec. 14, 2016

(87) PCT Pub. No.: WO2016/000570
PCT Pub. Date: Jan. 7, 2016

(65) Prior Publication Data
US 2017/0131691 A1 May 11, 2017

Related U.S. Application Data

(63) Continuation of application No. 14/577,772, filed on Dec. 19, 2014, now Pat. No. 9,626,157, and a
(Continued)

(30) Foreign Application Priority Data

Feb. 5, 2015 (CN) .......................... 201510061134.9

(51) Int. Cl.
*G06F 8/34* (2018.01)
*G06F 8/20* (2018.01)
(Continued)

(52) U.S. Cl.
CPC .................. *G06F 8/34* (2013.01); *G06F 8/20* (2013.01); *G06F 8/35* (2013.01); *G06F 8/38* (2013.01);
(Continued)

(58) Field of Classification Search
CPC ... G06F 8/34; G06F 8/20; G06F 21/31; G06F 8/38; G06F 16/9577; G06F 9/451;
(Continued)

(56) References Cited

U.S. PATENT DOCUMENTS

| | | | |
|---|---|---|---|
| 2003/0120597 A1* | 6/2003 | Drummond | G07F 19/20 707/E17.107 |
| 2006/0052884 A1* | 3/2006 | Staples | G05B 19/0426 700/20 |

(Continued)

*Primary Examiner* — Mouloucoulaye Inoussa
(74) *Attorney, Agent, or Firm* — Hamilton, Brook, Smith & Reynolds, P.C.

(57) ABSTRACT

In a method of group control and management among electronic devices, wherein the electronic devices is in communication with a control device, a projectable space instance is provided for the control device to create a workspace, wherein a control and management tool and a plurality of unified tools for driving respective electronic devices are selectively added to the projectable space instance. The projectable space instance is then parsed with a projector by the control device to automatically generate a projected workspace corresponding to the workspace to be created via the projectable space instance. The control and management tool realizes at least one status information of at least a first one of the electronic devices by way of the unified tools, and controls at least a second one of the electronic devices to execute at least one task corresponding to the at least one status information.

12 Claims, 14 Drawing Sheets

Related U.S. Application Data continuation of application No. 14/325,466, filed on Jul. 8, 2014, now Pat. No. 9,727,391, said application No. 14/577,772 is a continuation-in-part of application No. 14/324,069, filed on Jul. 3, 2014, now Pat. No. 9,134,963.

(51) Int. Cl.

| | | |
|---|---|---|
| *G06F 21/31* | (2013.01) | |
| *G06F 8/38* | (2018.01) | |
| *G06F 40/106* | (2020.01) | |
| *G06F 9/451* | (2018.01) | |
| *G06F 9/445* | (2018.01) | |
| *G06Q 50/16* | (2012.01) | |
| *H04L 67/02* | (2022.01) | |
| *H04N 7/173* | (2011.01) | |
| *G06F 8/35* | (2018.01) | |
| *H04L 9/40* | (2022.01) | |
| *H04L 67/01* | (2022.01) | |
| *G06F 9/50* | (2006.01) | |
| *G06F 9/54* | (2006.01) | |
| *G06Q 10/06* | (2012.01) | |
| *H04L 67/10* | (2022.01) | |

(52) U.S. Cl.
CPC .............. *G06F 9/445* (2013.01); *G06F 9/451* (2018.02); *G06F 21/31* (2013.01); *G06F 40/106* (2020.01); *G06Q 50/163* (2013.01); *H04L 67/02* (2013.01); *H04N 7/173* (2013.01); *G06F 9/5055* (2013.01); *G06F 9/5061* (2013.01); *G06F 9/54* (2013.01); *G06Q 10/06* (2013.01); *G06Q 10/06316* (2013.01); *H04L 63/102* (2013.01); *H04L 67/01* (2022.05); *H04L 67/10* (2013.01)

(58) Field of Classification Search
CPC .... G06F 40/106; G06F 9/452; G06F 3/04815; G06F 8/35; G06F 16/3334; G06F 16/951; G06F 16/9535; G06F 21/88; G06F 3/165; H04L 67/12; H04L 63/102; H04L 63/14; H04L 67/42; H04L 67/2823; H04L 67/38; H04L 67/141; H04L 67/02; H04L 12/1827; H04L 65/403; H04L 51/20; H04W 4/08; H04W 12/12; H04W 12/082; H04W 12/126; H04W 8/245; G05B 19/0421; H04M 3/42161; H04M 3/563; F03D 7/047; Y02E 10/72; G06Q 10/10
USPC ........... 700/90, 287; 707/707, 708, E17.109; 715/752, 753, 760, 744
See application file for complete search history.

(56) References Cited

U.S. PATENT DOCUMENTS

| | | | |
|---|---|---|---|
| 2007/0260702 A1* | 11/2007 | Richardson | G06F 16/95 709/217 |
| 2009/0217163 A1* | 8/2009 | Jaroker | G06F 8/60 717/174 |
| 2010/0030937 A1* | 2/2010 | Schuermann | G05B 19/0428 710/110 |
| 2011/0178462 A1* | 7/2011 | Moberg | A61B 5/14532 604/151 |
| 2011/0185286 A1* | 7/2011 | Moyers | H04L 12/1827 715/752 |
| 2012/0020786 A1* | 1/2012 | Ayres | F03D 7/047 700/287 |
| 2012/0275581 A1* | 11/2012 | Poder | H04M 3/436 379/88.22 |
| 2013/0031483 A1* | 1/2013 | Vure | G05B 19/0421 715/744 |
| 2014/0021899 A1* | 1/2014 | Lai | H02P 7/05 318/445 |
| 2014/0032759 A1* | 1/2014 | Barton | H04L 63/20 709/225 |
| 2015/0161256 A1* | 6/2015 | Jeh | G06F 16/3334 707/707 |

* cited by examiner

GROUP CONTROL AND MANAGEMENT AMONG ELECTRONIC DEVICES

TECHNICAL FIELD

The present invention relates to a control method, and particularly to a method of group control and management among electronic devices. The present invention also relates to a control device executing a group control and management method among electronic devices by building up a workspace.

BACKGROUND

As information and communications technology improves every day, building an informationized, digitized, human-centered and facilitative smart life has become a trend in the future. Meanwhile, home appliances that are parts of our daily lives would become keys to digital homes and smart lives for sure. Hence, the development of intelligentized home appliances would be one of the mainstreams in industry.

Smart home appliances generally refer to consumer electronics and home appliances with ability to link to internet, including wide area service network, local area home network, or any other suitable network. Home appliances interconnected via internet and integrated as a system can be used to build up digital homes and smart lives.

For integrating and communicating home appliances with one another, different types of home appliances, home appliances produced by different designers or manufacturers and/or home appliances performing different functions are linked through a unified communication protocol. For example, Qualcomm Technologies, Inc. (hereinafter ""Qualcomm") has developed a communication chip based on the AllJoyn open software architecture. Home appliances installed with the communication chip are then able to communicate and interact with one another through the AllJoyn platform.

Please refer to FIG. 1, which is a scheme showing conventional communication among home appliances installed with AllJoyn communication chips. As shown in FIG. 1, AllJoyn communication chips 111 and 121 developed based on the AllJoyn open software architecture are installed in a first electronic device 11 (such as a water heater tank) and a second electronic device 12 (such as a television), respectively. Meanwhile, a first device driver 131 for driving the first electronic device 11, a second device driver 132 for driving the second electronic device 12, and means 133 for controlling and managing the first electronic device 11 and the second electronic device 12, e.g. a software program, are installed in a control device 13 (such as a computer). Since the first device driver 131, the second device driver 132 and the control and management means 133 all comply with the AllJoyn protocol, the first electronic device 11 driven by the first device driver 131 and the second electronic device 12 driven by the second device driver 132 can successfully communicate with each other via the control and management means 133. In other words, through the first device driver 131, second device driver 132 and control and management means 133, the first electronic device 11 and the second electronic device 12 are interoperable to achieve cooperative and interactive objectives. In addition, several corporations including Microsoft, Philips and Sony have established another communication protocol, Digital Living Network Alliance (DLNA), for communication and interaction among home appliances. Green Energy & Environment Research Laboratories of Industrial Technology Research Institute (Taiwan) further provides a SAANet control protocol available to home appliance manufacturers.

Please refer to FIG. 2, which is a scheme showing conventional communication among home appliances installed with different communication chips executing different communication protocols. As shown in FIG. 2, a first electronic device 11 (such as a water heater tank) is installed with an AllJoyn communication chip 111 developed based on the AllJoyn open software architecture. A third electronic device 16 (such as a television) is installed with a DLNA communication chip 161 developed based on the DLNA communication protocol. A fourth electronic device 14 (such as a refrigerator) is installed with a SAANet communication chip 141 developed based on the SAANet control protocol. Meanwhile, a first device driver 151, a third device driver 152 and a fourth device driver 153 are installed in a control device 15 (such as a computer), wherein the first device driver 151 developed based on the AllJoyn open software architecture supports the first electronic device 11, the third device driver 152 developed based on the DLNA communication protocol supports the third electronic device 16, and the fourth device driver 153 developed based on the SAANet control protocol supports the fourth electronic device 14.

Since the first device driver 151, the third device driver 152 and the fourth device driver 153 do not work under a common communication protocol, the first electronic device 11, the third electronic device 16 and the fourth electronic device 14 cannot successfully interact and communicate with one another. Furthermore, since home appliance manufacturers may be in a competitive relationship to one another, it might be hard to coordinate the home appliance manufacturers to accept a common communication protocol or use a common communication chip under consideration of commercial profits.

FIG. 3 schematically shows how a conventional communication method makes the communication and interaction among home appliances installed with different communication chips and executing different communication protocols possible. As shown in FIG. 3, an interface 154 developed and designed by any of the manufacturers of the home appliance, the manufacturer of the control device, or a third party is installed in a control device 15' as a communication medium among the first device driver 151, the third device driver 152 and the fourth device driver 153. Accordingly, the first electronic device 11, the third electronic device 16 and the fourth electronic device 14 can communicate and interact with one another successfully. Unfortunately, there would always be new communication protocols developed for new or existing home appliances in the future. The new communication protocols might be unable to communicate with one other or with the existing ones. Under this circumstance, the interface 154 installed in the control device 15' might need to be updated frequently, and thus a burden would be rendered. Once the interface 154 cannot be updated any longer due to a variety of reasons, home appliances using communication chips developed based on new communication protocols would be unable to communicate and interact with other home appliances. This might cause problems in use. Therefore, an operating environment which is so flexible that a new communication protocol can be added to the control device easily and compatibly, and any undesired communication protocol can be removed from the control device at any time, is required.

SUMMARY

Therefore, an object of the present invention is to provide a group control and management method, which conveniently and efficiently conducts communication and interaction among electronic devices such as home appliances. For instance, it would be annoying if water cannot be heated during shower due to dead battery, but no one else knows unless the one who is taking a shower shouts aloud. Therefore, by way of a group control and management method according to the present invention, a warning notice may be revealed by one or more of other home appliances when a low battery level of the water heater is detected so as to avoid and readily solve the above-mentioned situation.

Another object of the present invention is to provide a control device that is capable of conducting group control and management among electronic devices such as home appliances easily and flexibly. The electronic devices could be developed based on different communication protocols and controlled by different types of communication chips.

In an aspect, the present invention provides a method of group control and management among electronic devices, wherein the electronic devices is in communication with a control device. The method comprises: providing a projectable space instance for the control device to create a workspace, wherein a control and management tool and a plurality of unified tools for driving respective electronic devices are selectively added to the projectable space instance; and parsing the projectable space instance with a projector by the control device to automatically generate a projected workspace corresponding to the workspace to be created via the projectable space instance, wherein the control and management tool realizes at least one status information of at least a first one of the electronic devices by way of the unified tools, and controls at least a second one of the electronic devices to execute at least one task corresponding to the at least one status information.

In another aspect, the present invention provides a control device for group control and management among electronic devices, comprising a projector for parsing a projectable space instance to build a projected workspace corresponding to a workspace to be created via the projectable space instance, wherein a control and management tool and a plurality of unified tools for driving respective electronic devices are selectively added to the projectable space instance, and the control and management tool realizes at least one status information of at least a first one of the electronic devices by way of the unified tools, and controls at least a second one of the electronic devices to execute at least one task corresponding to the at least one status information.

In an embodiment, the control and management tool is a notifying tool, which realizes and transmits status information of the first electronic device to the second electronic device to have the status information displayed, processed and/or operated by the second electronic device.

In an embodiment, the unified tools include a first device driver and a second device driver specific to the first electronic device and the second electronic device, respectively, and the control and management tool detects the at least one status information of the first electronic device via the first device driver, and drives the second electronic device to execute the at least one task corresponding to the at least one status information via the second device driver.

In an embodiment, the unified tools are obtained by unifying device drivers specific to the electronic devices, respectively, wherein each of the device drivers is used for communicating a corresponding one of the electronic devices with the control and management tool.

In an embodiment, at least one of the device drivers is developed by way of a software development kit.

In an embodiment, the device drivers are configured into the projected workspace after being unified in order to be compatible with one another.

In an embodiment, the control and management tool is configured into at least one of the unified tools.

In an embodiment, the first electronic device and the second electronic device are different types of electronic devices.

In an embodiment, the first electronic device and the second electronic device are manufactured by different manufacturers, exhibit different functions, or are manufactured by different manufacturers and exhibit different functions.

In an embodiment, the method is applied for group controlling and managing a home appliance system, a medical equipment system, a security control system, a firefighting control system or a transportation control system.

In an embodiment, the control device is a computer, a home appliance, a handheld electronic device, or a wearable electronic device.

In an embodiment, the projectable space instance is an object, an XML document, or an instance which is instantiated with a structured language or a structured protocol.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION

The present invention can be readily appreciated by referring to the following descriptions, including the following glossary of terms and the concluding examples. It is to be noted that some patent publication numbers or patent application numbers are cited throughout the specification, and the entire disclosures thereof are to be incorporated herein for reference.

In the embodiments described below, the present invention is described by way of examples and characteristic illustrations, but is not to be limited to the examples and characteristic illustrations. The term "information source" used herein indicates a symbolic sequence of useful information that can be specifically interpreted as, but not limited to, a message for organizing and labeling data. The information source includes a website (such as internet service), intranet, software, electronic book, database and other media of information (such as storage media of non-transitory computer or storage media of mobile device). The term "original information" used herein indicates, but is not limited to, a file, web page, database row, policy, rule or any information accessible from corresponding machine or server. The term "tool" used herein indicates, but is not limited to, a utility, widget, agent, application, service or any executable element accessible from corresponding machine or server.

Further, the "original information" and the "original tool" are embodiments of the "original matter" in the present invention. By way of a unifying method, multiple "original matters" from the same or different "information sources" are modeled into multiple "unified matters". The resulting "unified matters" existing in the same working environment are then compatible with one another and capable of conducting cooperative task. Moreover, the "unified tool" and the "unified information unit" are embodiments of the "unified matter" in the present invention. The term "matterizer" used herein indicates a component, device or program code for unifying the "original matter".

In a preferred embodiment, the unifying method mentioned above includes steps of reorganizing at least one original information obtained from at least one of the multiple information sources based on a unified data structure, thereby modeling the original information into a unified information unit; and/or reorganizing at least one original tool obtained from at least one of the multiple information sources based on another unified data structure, thereby modeling the original tool into a unified tool. The unified data structure and the another unified data structure may be the same or different. The unifying method can be implemented with a matterizer.

Figure 1:
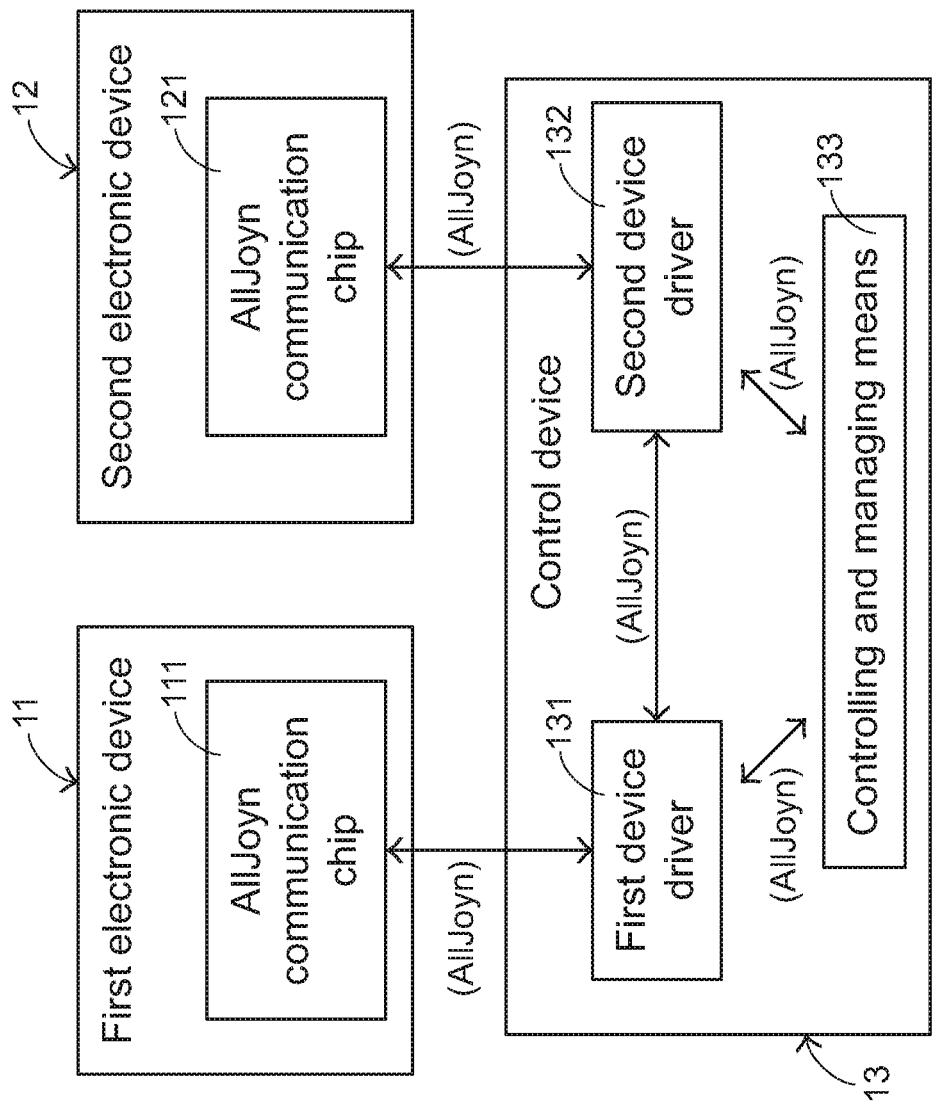
FIG. 1 is a scheme showing a conventional method of communication among home appliances installed with AllJoyn communication chips.
Figure 2:
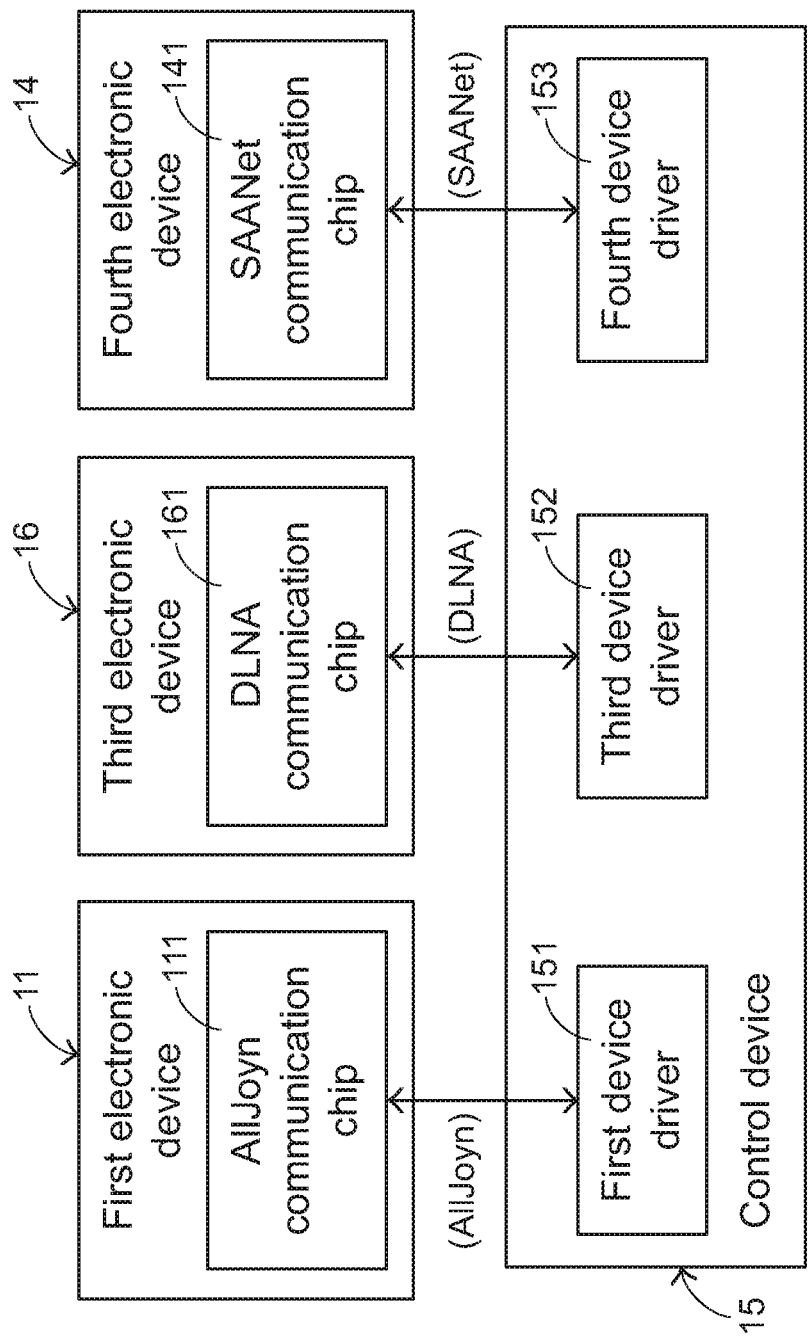
FIG. 2 is a scheme showing another conventional method of communication among home appliances installed with different communication chips executing different communication protocols.
Figure 3:
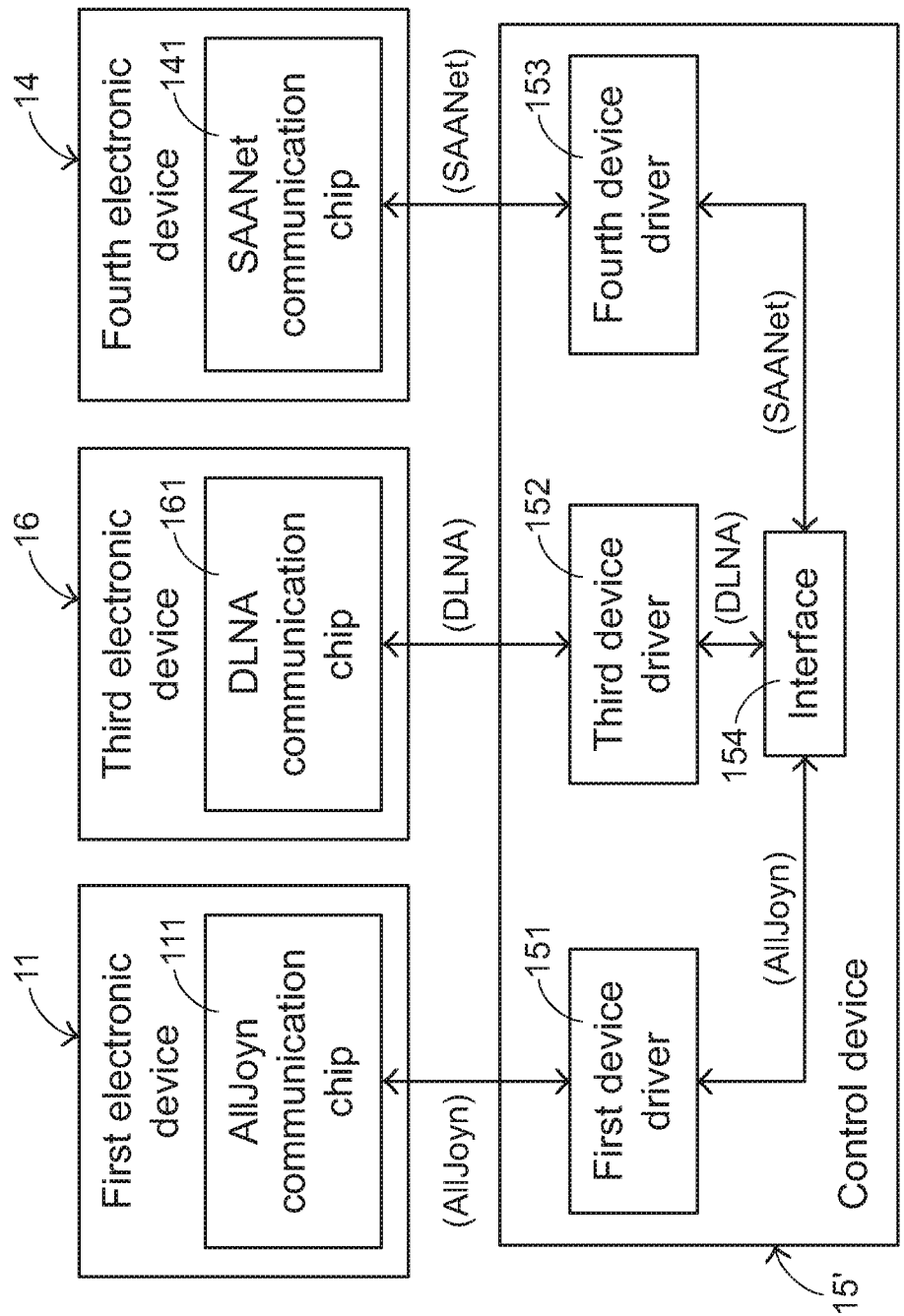
FIG. 3 is a scheme showing a further conventional method of communication among home appliances installed with different communication chips and executing different communication protocols.
Figure 4:
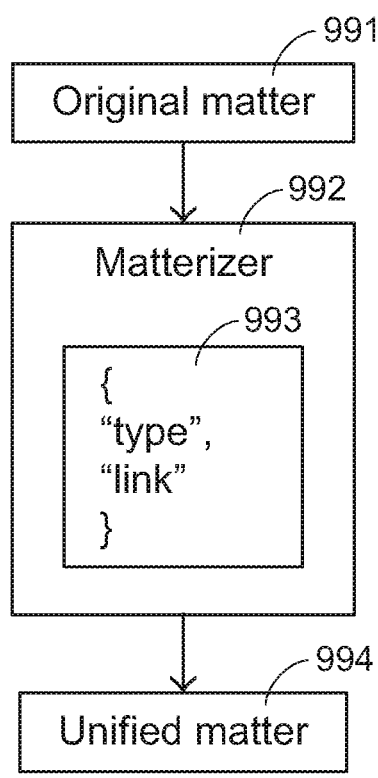
FIG. 4 is a scheme showing a unifying method, which is applicable to the present invention for facilitating group control and management among electronic devices.

Please refer to FIG. 4, which is a scheme showing a unifying method, which is applicable to the present invention for facilitating group control and management among electronic devices. As shown in FIG. 4, a matterizer 992 reorganizes an attribute and an associated link of an original matter 991 based on a unified data model 993, thereby modeling the original matter 991 into a unified matter 994. The resulting basic attribute of the unified matter 994 then includes a type and a link of the original matter 991.

In this embodiment, the original matter 991 could be, but is not limited to an original information and/or an original tool. In the above mentioned unifying method, if the attribute accessible from the original information complies with the attribute requirement of the unified information unit, the unified information unit can be directly generated through the matterizer 992. On the other hand, if the attribute accessible from the original information does not comply with the attribute requirement of the unified information unit, a process of logically reorganizing the attribute and the associated link of the original information to redefine the original information is needed, in order to transform the original information into a new original information with an attribute consistent to the attribute requirement of the unified information unit. Under this circumstance, the unified information unit is indirectly generated.

Furthermore, the unified tool is directly generated through the matterizer 992 when the original tool is compatible with the working environment of the workspace; and an adapter and/or a software development kit (SDK) for driving the original tool would be required as a medium for generating the unified tool, i.e. indirectly, when the original tool is incompatible with the working environment of the workspace. In other words, the adapter is used to provide an interface implementation to fit the working environment.

The details of the embodiments of unifying method, the acquisition of the unified matters and the operation of the matterizer according to the present invention can be understood with reference to, but not limited to, the U.S. patent application Ser. No. 14/324,069, entitled "A method of unifying information and tool from a plurality of information sources" as well as the China Patent Application No. 201410768564.X, which claims the benefit of priority to the U.S. patent application Ser. No. 14/324,069 and is entitled "A method of unifying information and tool from a plurality of information sources and computer product and device using the method", which are assigned to the same assignee. The entire disclosures of the co-pending patent applications are incorporated herein for reference, and would not be redundantly described. Furthermore, those skilled in the art may make equivalent modifications according to practical requirements.

Hereinafter, two more examples of unifying methods applicable to the present invention are given as follows. The first one is an information unifying method applied to Garmin satellite navigation. Similar to above-mentioned unifying method, a unified point information (regarded as the unified information unit of the present invention) corresponding to an original point information (regarded as the original information of the present invention) is obtained after a unifying process is performed on the original point information by executing the Point of Interest (POI) function of Garmin satellite navigation. The second one is a tool unifying method applied to an Android system. An Android system is an open source mobile operating system based on Linux. In general, application programs (regarded as the original tool of the present invention) of Android systems are written in Java. Therefore, application programs (regarded as the original tool of the present invention) written in Java can be modeled into unified applications (regarded as the unified tool of the present invention) compatible with the Android system. The resulting unified application programs corresponding to the application programs written in Java are then executable in the Android system.

Figure 5:
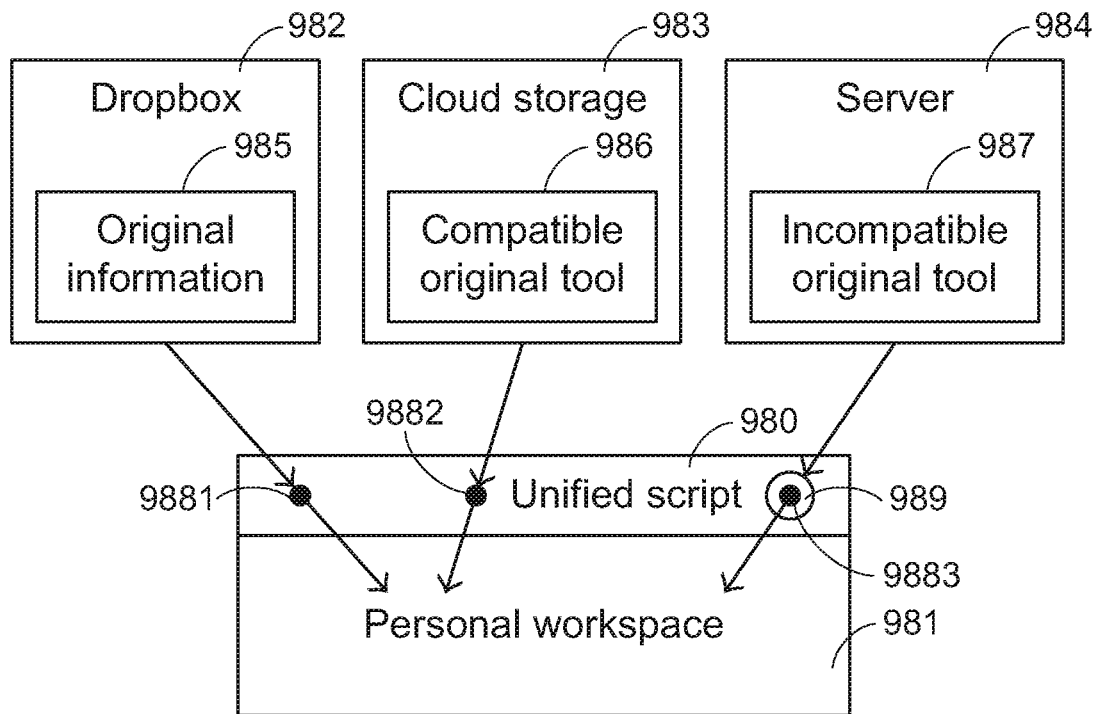
FIG. 5 is a scheme illustrating implementation of a personal workspace with a unified script used as an intermediate language.

The workspace described herein is a space where at least one matterizer, at least one information and/or at least one tool can interact with one another and/or execute specified tasks. The at least one information and/or at least one tool can be, but is not limited to be, imported into the workspace through the at least one matterizer. Information importers 9881, 9882 and 9883 to be described later with reference to FIG. 5 are exemplified embodiments of the matterizer. The unified script described herein is an intermediate language for implementing the workspace, and the at least one matterizer, the at least one information and/or the at least one tool are provided, for example built-in or plugged-in, to the workspace by way of the unified script.

In an embodiment, the above-mentioned at least one information is a unified information unit which is generated after at least one original information obtained from at least one information source is unified. The above-mentioned at least one tool is a unified tool which is generated after at least one original tool obtained from at least one information source is unified. Any user could add, build or plug any unified information unit he needs and/or unified tool he needs from corresponding information sources into a personal workspace according to practical needs. In other words, the workspace can be a user-oriented personal workspace.

Figure 6:
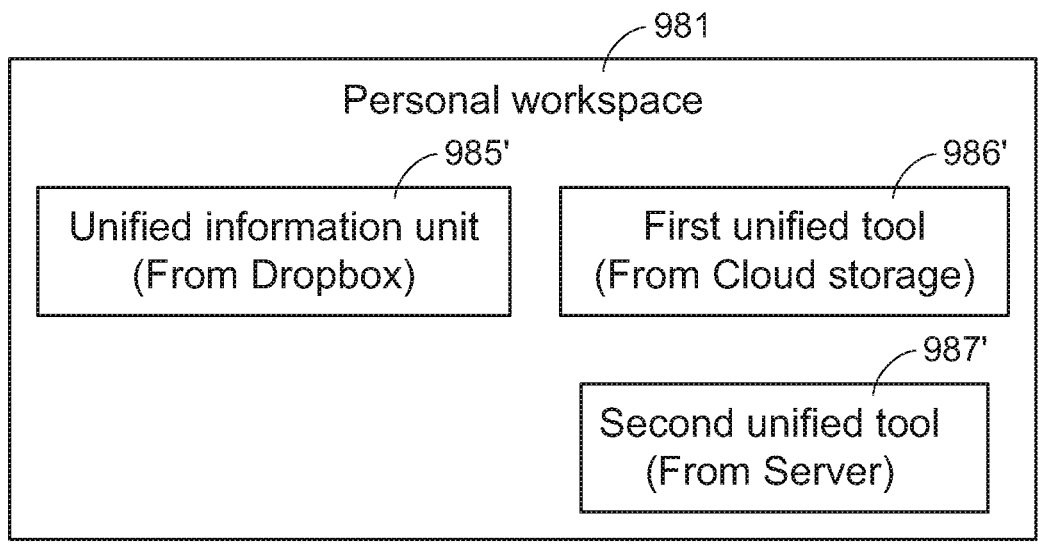
FIG. 6 is a schematic block diagram exemplifying allocation of unified matters in a personal workspace, which is applicable to the present invention for facilitating group control and management among electronic devices.

Please refer to FIG. 5 and FIG. 6. FIG. 5 schematically illustrates an implementation concept of using the unified script as an intermediate language for implementing the workspace, and FIG. 6 schematically illustrates an exemplified configuration of a personal workspace. As shown in FIG. 5 and FIG. 6, a unified information unit 985' corresponding to an original information 985 in the Dropbox 982, a first unified tool 986' corresponding to a compatible original tool 986 in the cloud storage 983 and a second unified tool 987' corresponding to an incompatible original tool 987 in a server 984 are selectively combined in a personal workspace 981 by a user. This can be accomplished by compiling a unified script 980 and configuring an information importer 9881 of Dropbox 982, an information importer 9882 of the cloud storage 983 and an information importer 9883 of the server 984 according to the unified script 980. Accordingly, the original information 985 in the Dropbox 982 can be unified into the unified information unit 985' and then imported into the personal workspace 981. For example without limitation, the unified script 980 is defined as an intermediate language for implementing the workspace, and the information importer 9882 is a matterizer of Dropbox.

As shown in FIG. 5 and FIG. 6, the original tool saved in the cloud storage 983 is a compatible original tool 986 which is compatible with the component architecture of the unified tool of the personal workspace 981. The first unified tool 986' corresponding to the compatible original tool 986 is directly provided to the personal workspace 981 through the information importer 9882 of the unified script 980.

On the other hand, the original tool saved in the server 984 is the incompatible original tool 987 which is incompatible with the component architecture of the unified tool of the personal workspace 981. Then the second unified tool 987' corresponding to the incompatible original tool 987 is indirectly provided to the personal workspace 981 through a compatible adaptor 989 and the information importer 9883 of the unified script 980.

FIG. 6 further shows that the unified information unit 985', the first unified tool 986' and the second unified tool 987' are flexibly configured and arranged, e.g. grouped or placed, by the user in a specified region of the personal workspace 981 according to practical needs. Afterwards, the user may use the unified tool to do what he wants to do, for example, to access and control the corresponding unified information unit by way of operations between the unified tool and the unified information unit, such as clicking or dragging.

The specific descriptions of using the unified script as the intermediate language for implementing the workspace and selectively combining unified information unit and unified tool from corresponding information sources into the personal workspace to perform tasks according to practical needs, as mentioned in the embodiments, can also be referred to a co-pending U.S. patent application Ser. No. 14/325,466, entitled "A method of combining unified matters in personal workspace", as well as the China Patent Application No. 201410796528.4, which claims the benefit of priority to the U.S. patent application Ser. Nos. 14/324,069 and 14/325,466 and is entitled "A method of combining unified matters in a personal workspace and computer product and device using the method", which are assigned to the same assignee, and will not be redundantly described herein.

The personal workspace mentioned above is just an embodiment of the workspace, and the workspace adapted to be used in the present invention is not limited thereto. For instance, a unified script which is regarded as the intermediate language for implementing the workspace can be edited in advance so as to render a workspace built in a matterizer, information and/or tool. Furthermore, the workspace is not limited to a private workspace, but can be provided for cooperative work among multiple users at the same or different time according to practical needs. Furthermore, the workspace can be projected to any electronic device with computing capability by way of a workspace-projecting method so that a user may use the projected workspace on that electronic device.

In an embodiment, the workspace-projecting method includes acquiring a projectable space instance which is instantiated from a unified script through a URI (uniform resource identifier). The unified script is defined to configure a matterizer, information and/or tool to model a workspace, as described above, and the projectable space instance is used for building a projected workspace corresponding to the workspace to provide an interface for operating the matterizer, information and/or tool. The workspace-projecting method further includes using a projector to parse the projectable space instance and build a working environment to configure the matterizer, information and/or tool, in order to execute the projected workspace. Then the user may interact with the projected workspace.

In the workspace-projecting method, the projector can be acquired from a remote data station, a projectable space instance or a preloaded application program, and loaded to an engine where a compatible working environment is provided for executing the projector. The engine includes, but is not limited to, a JavaScript engine, a Windows application, and/or a Linux application program. Furthermore, the unified script can be declared by a DTD (Document Type Definition), an XML Schema, a structured language or a structured protocol, but is not limited thereto. The projectable space instance can be, but is not limited to, an object, an XML document, or an instance which is instantiated with the structured language or the structured protocol.

Figure 7:
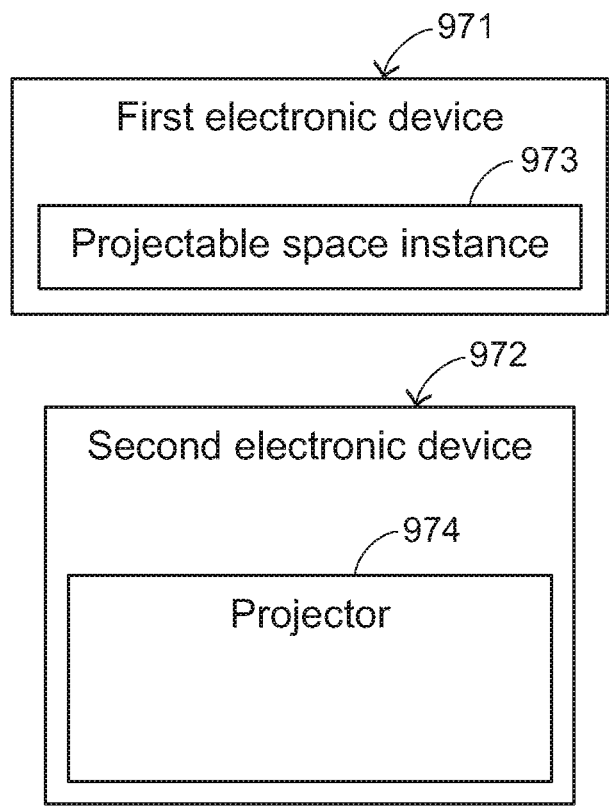
FIGS. 7, 8A and 8B are schematic diagrams exemplifying creation of a projected workspace, which is applicable to the present invention for facilitating group control and management among electronic devices.
Figure 8A:
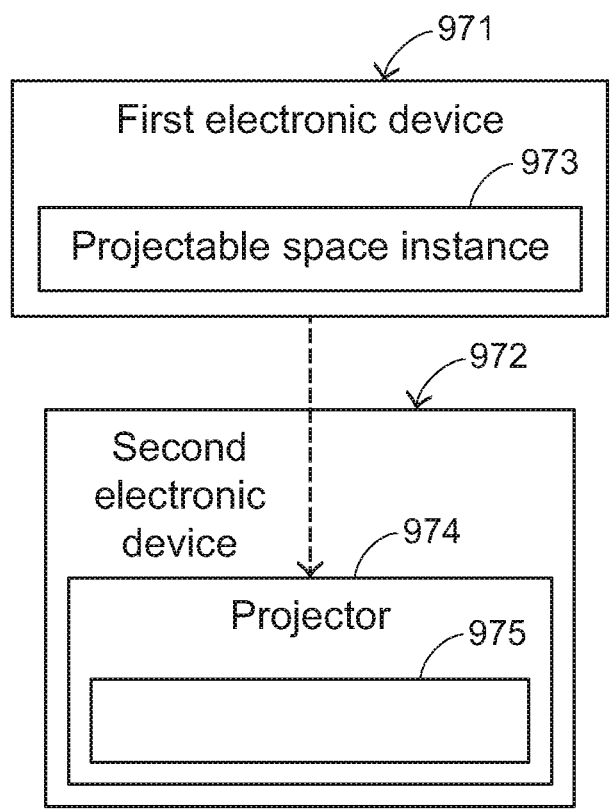
Figure 8B:
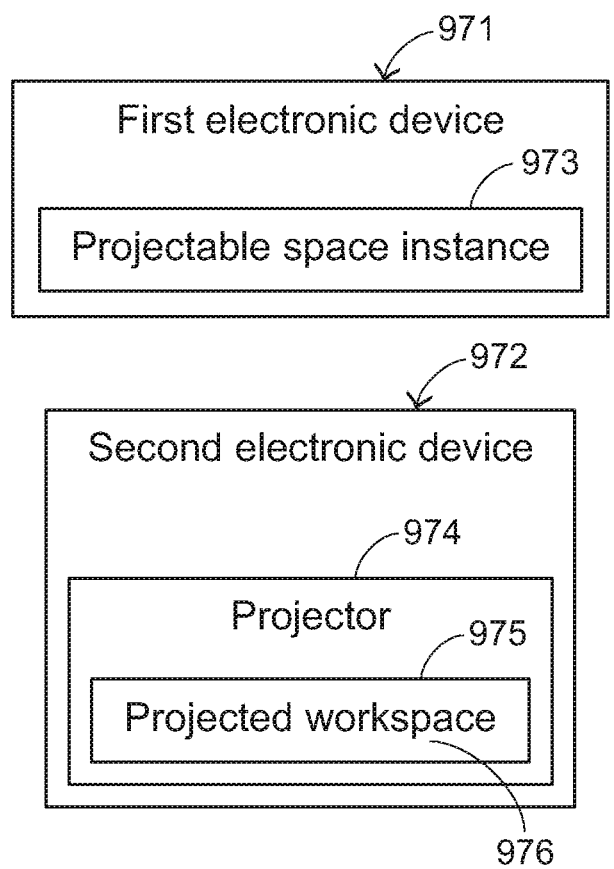
Figure 9:
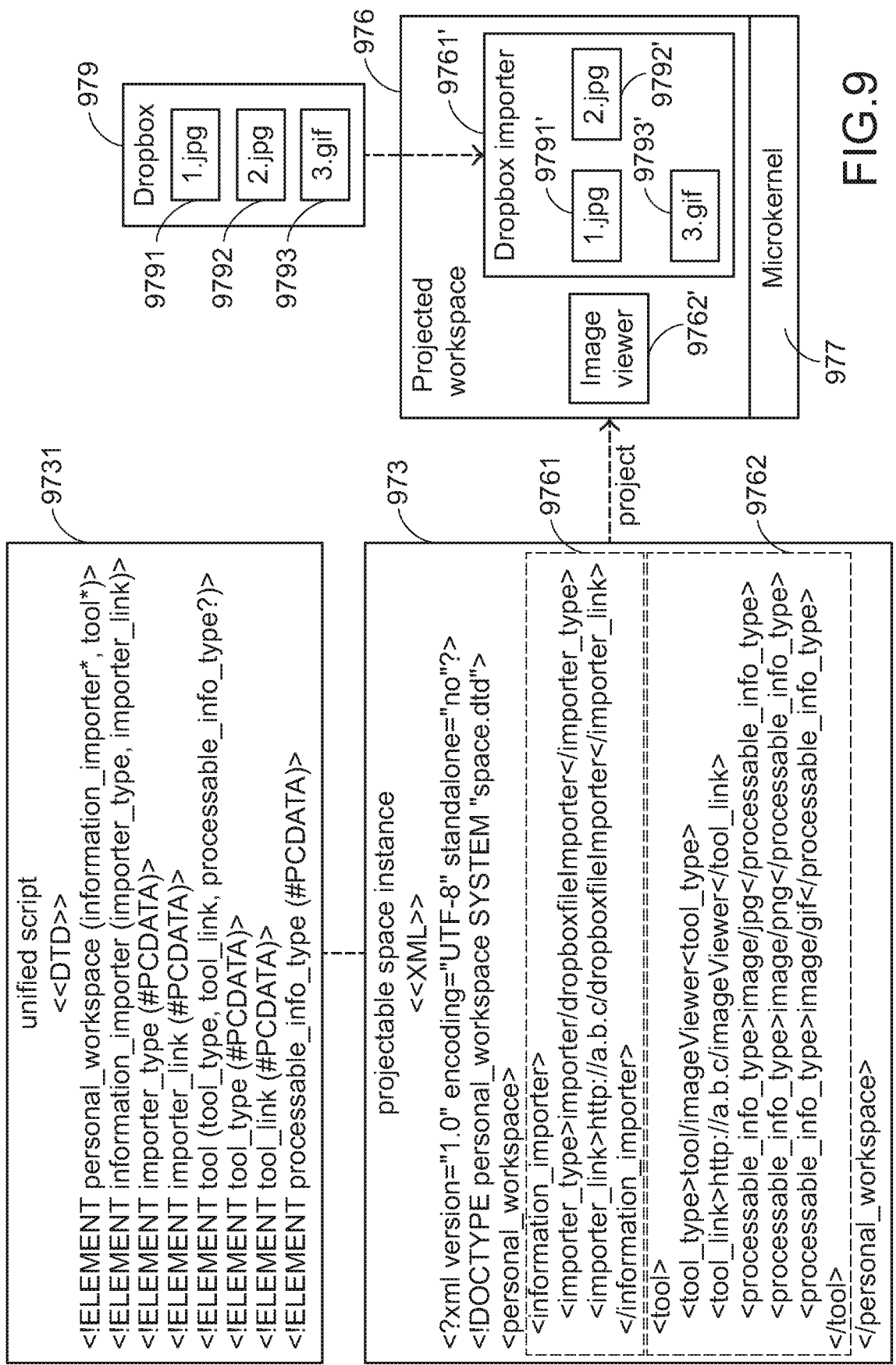
FIG. 9 is a schematic diagram exemplifying the relationship between a projectable space instance and a projected workspace applicable to the present invention for facilitating group control and management among electronic devices.

Furthermore, the workspace-projecting method will be illustrated in more detail by way of some embodiments. Please refer to FIG. 7, FIG. 8A, FIG. 8B and FIG. 9. FIG. 7 schematically illustrates an initial state before the workspace-projecting method is performed. FIG. 8A and FIG. 8B schematically illustrates the progresses of the workspace-projecting method. FIG. 9 schematically shows the relationship between a projectable space instance as shown in FIG. 7 and a projected workspace as shown in FIG. 8B. As shown in FIG. 5, a first electronic device 971 and a second electronic device 972 can be interconnected to each other, for example, through the internet. Furthermore, the projectable space instance 973 is saved in the first electronic device 971, and a built-in projector 974 is saved in the second electronic device 972.

In this embodiment, a unified script 980 is declared by the DTD (Document Type Definition) for configuring at least one information importer, at least one unified information and/or at least one unified tool to model a workspace. The information importer is an embodiment of the matterizer. Moreover, the projectable space instance 973 is an object which is instantiated with XML. As shown in FIG. 9, the projectable space instance 973 is used for building the projected workspace 976 corresponding to the workspace. Besides, the information importer, the unified information and/or the unified tool is allowed to be added in or removed from the projectable space instance 973. The above-mentioned descriptions will be illustrated in more details as follows.

Furthermore, the projector 974 of the second electronic device 972 will establish a working environment 975 on the second electronic device 972 for executing the projected workspace 976, and the projector 974 provides a microkernel 977 (see FIG. 9) to the working environment 975 for equipping at least one information importer, at least one unified information and/or at least one unified tool which is/are going to be added to the projected workspace 976. When the second electronic device 972 acquires the projectable space instance 973 saved in the first electronic device 971 through a URI, the projector 974 of the second electronic device 972 starts to parse the projectable space instance 973, as shown in FIG. 8A. After the projectable space instance 973 is parsed by the projector 974, the projected workspace 976 is created in the working environment 975 according to parsed contents of the projectable space instance 973, as shown in FIG. 8B. Accordingly, a user of the second electronic device 972 can interact with the projected workspace 976 through the second electronic device 972 to perform related tasks.

The relationships between above mentioned unified script 980, the projectable space instance 973 and the projected workspace 976 will be illustrated in more detailed by way of a practical condition as shown in FIG. 9. As shown in FIG. 9, a workspace which can be projected and is capable of accessing jpg format image files and gif format image files saved in a specified internet space is created for making the image files visible to a user. In this example, the unified script 980 is declared by the Document Type Definition (DTD), and the projectable space instance 973 is instantiated with XML.

Moreover, the information importer and the unified tool will be added into the projectable space instance 973, and the information importer is used to import at least one unified information unit corresponding to original information into the projected workspace 976. In this example, the information importer is a Dropbox importer (the information of the Dropbox importer is exemplified in the dashed line frame 9761 of FIG. 9). The original information are jpg format image file 9791, jpg format image file 9792 and gif format image file 9793 stored in Dropbox 979, and the unified information units are unified jpg format image file 9791', unified jpg format image file 9792' and unified gif format image file 9793'. The unified tool is an image viewer (the information of the unified tool is exemplified in the dashed line frame 9762 of FIG. 9) used for accessing image files which are imported into the projected workspace 976.

As mentioned previously, the projected workspace 976 is created after the projectable space instance 973 is parsed by the projector 974 of the second electronic device 972. In this example, the Dropbox importer 9761' (corresponding to the dashed line frame 9761) and the image viewer 9762' (corresponding to the dashed line frame 9762) are configured in the projected workspace 976. The Dropbox importer 9761' unifies and imports the jpg format image file 9791, the jpg format image file 9792 and the gif format image file 9793 from Dropbox 979 into the projected workspace 976. Then the unified jpg format image file 9791', the unified jpg format image file 9792' and the unified gif format image file 9793' corresponding to the jpg format image file 9791, the jpg format image file 9792 and the gif format image file 9793, respectively, are present in the projected workspace 976. When the user of the second electronic device 972 manipulates any of the unified image files 9791', 9792' and 9793' by way of any suitable means, e.g. clicking on the icon representing one of the unified images files 9791', 9792' and 9793', or dragging and dropping the icon representing one of the image files 9791', 9792' and 9793' to the image viewer 9762', the image viewer 9762' will access contents of the corresponding unified image file 9791', 9792' or 9793' to present the unified image file 9791', 9792' or 9793' in front of the user. The information importer 9761' and the image viewer 9762' mentioned above may be equipped by the microkernel 977.

It is to be noted that the URI of the projectable space instance 973 may be a HTTP (hypertext transfer protocol) URI or a FTP (file transfer protocol) URI. When the first electronic device 971 and the second electronic device 972 are integrated into one device, the URI of the projectable space instance 973 can also be a local file URI. The URI of the projectable space instance 973 is not limited to the above-mentioned types. The projectable space instance 973 can be accessed by not only an original editor, but also an authorized user or an authorized electronic device. For instance, the authorized user may, but is not limited to, acquire the projectable space instance 973 through the URI by using an authorized user account and password.

A related art disclosed in patent application Ser. No. 14/577,772, entitled "Method of projecting a workspace and system using the same" and assigned to the same assignee, as well as the China Patent Application No. 201410814138.5, which claims the benefit of priority to the U.S. patent application Ser. Nos. 14/324,069, 14/325,466 and 14/577,772 and is entitled "Method of projecting a workspace and system using the same", are applicable to embodiments of the present invention. The disclosure of the co-pending patent applications are incorporated herein for reference.

It is to be noted that the workspace-projecting method described above is only one of the examples for projecting a workspace to any electronic device with computing capability. Those who are skilled in the art may make variations and modifications to the workspace-projecting method described above depending on practical requirements.

With the utilization of the above-mentioned or other related art, a method of group control and management among electronic devices is developed according to the present invention. An objective of group control and management among electronic devices according to the present invention is to make it possible to have different electronic devices interact with one another. When applied to home appliances, the group control and management method can be designed according to daily life requirements so as to improve quality of life. The different electronic devices, for example, may be the same type of electronic devices manufactured by different manufacturers but exhibiting similar functions. They could also be different types of electronic devices manufactured by the same of different manufacturers and exhibiting different functions. Although the group control and management method is adapted to be used among intelligent home appliances, it is also applicable to other electronic devices existing in the same inter-communicable environment. For instance, the method may be applied to medical environment, security environment or transportation environment, where group control and management among medical devices can be conducted. Alternatively, the method may be applied to a fire fighting control system, or any other suitable Internet of Things. In this example, the first electronic device is a smoke detector, the second electronic device is a fire sprinkler or an alarm system, and the projectable space instance can be compiled to have the first electronic device and the second electronic device to execute a specific task. For example, when the smoke detector detects a smoke level exceeding a default value, the fire sprinkler will be actuated to sprinkle or the alarm system will be actuated to notify the fire department or security center.

Hereinafter, a group control and management method of electronic device according to the present invention will be described in more detail by way of embodiments with reference to accompanying drawings.

Figure 10:
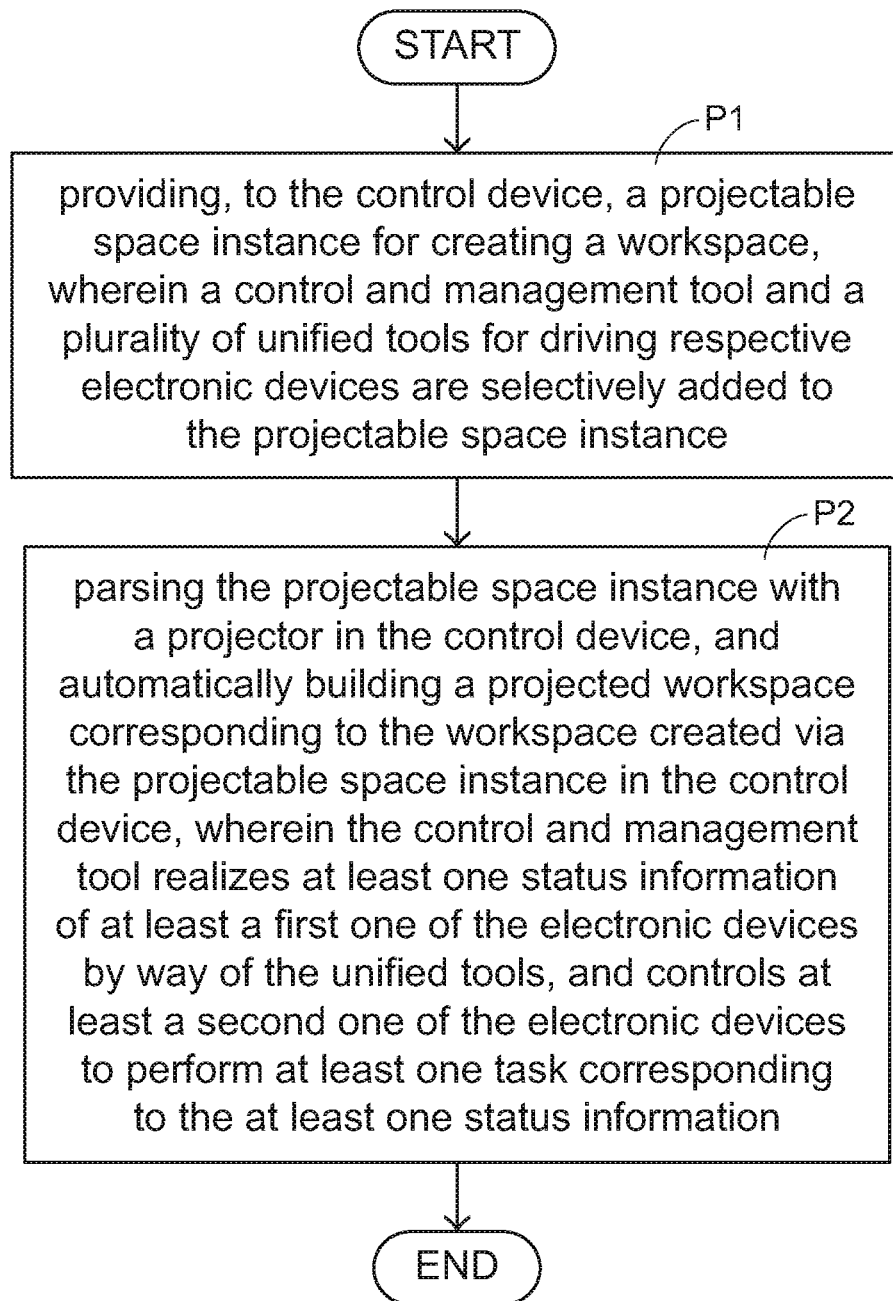
FIG. 10 is a flowchart illustrating a method of group control and management among electronic devices according to the present invention.

Please refer to FIG. 10, which is a flowchart illustrating a method of group control and management among electronic devices according to the present invention. The electronic devices are in communication with a control device. The group control and management method includes Step P1: providing, to the control device, a projectable space instance for creating a workspace, wherein a control and management tool and a plurality of unified tools for driving respective electronic devices are selectively added to the projectable space instance; and Step P2: parsing the projectable space instance with a projector in the control device, and automatically building a projected workspace corresponding to the workspace created via the projectable space instance in the control device, wherein the control and management tool realizes at least one status information of at least a first one of the electronic devices by way of the unified tools, and controls at least a second one of the electronic devices to perform at least one task corresponding to the at least one status information.

The projectable space instance is configured, for example by a user, in accordance with a desired control and management design to be executed by the control device, and will be illustrated in more detail later.

Figure 11:
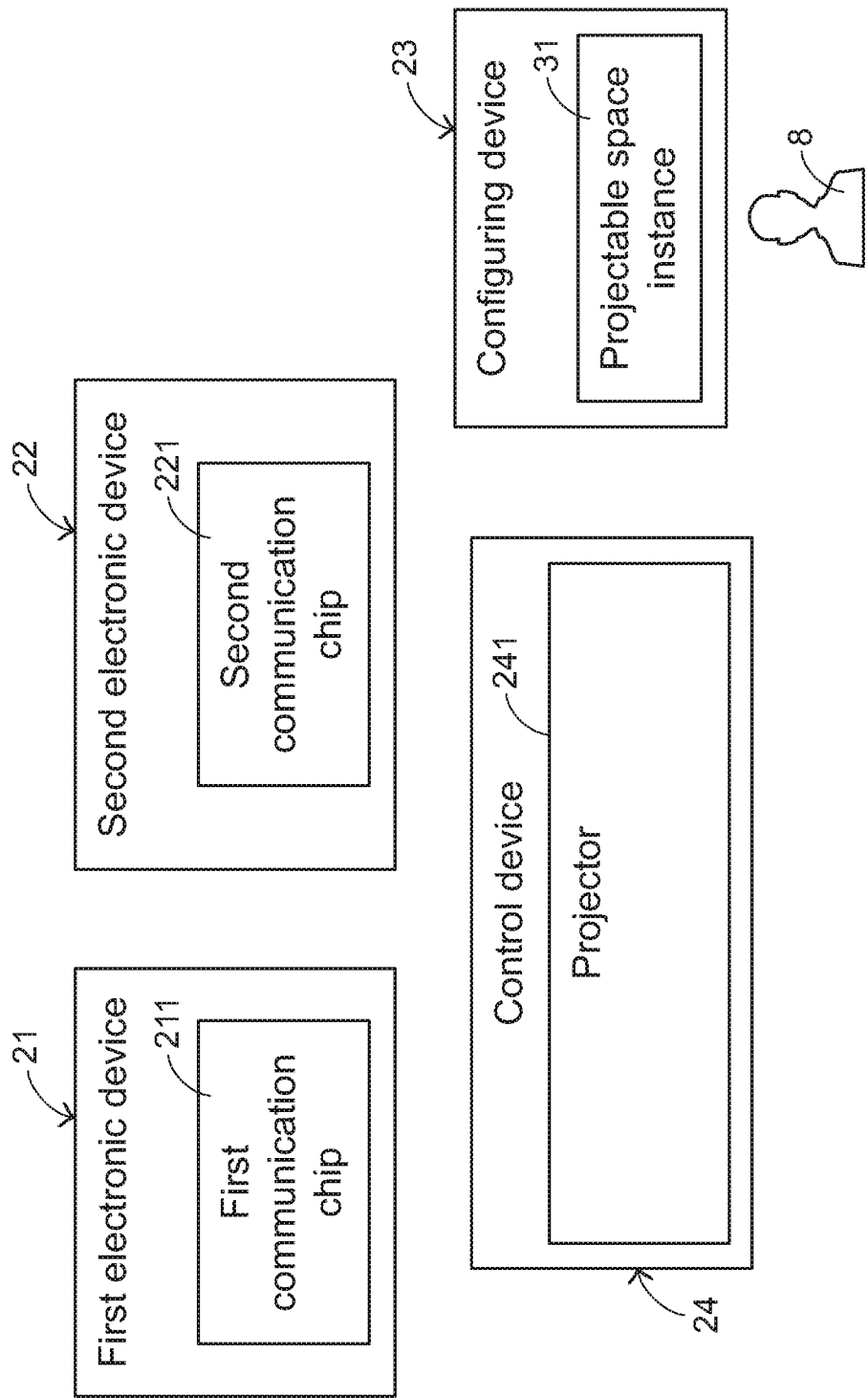
FIGS. 11 and 12 are schematic diagrams illustrating a group control and management method according to an embodiment of the present invention, wherein a projected workspace is created to conduct group control and management among electronic devices.
Figure 12:
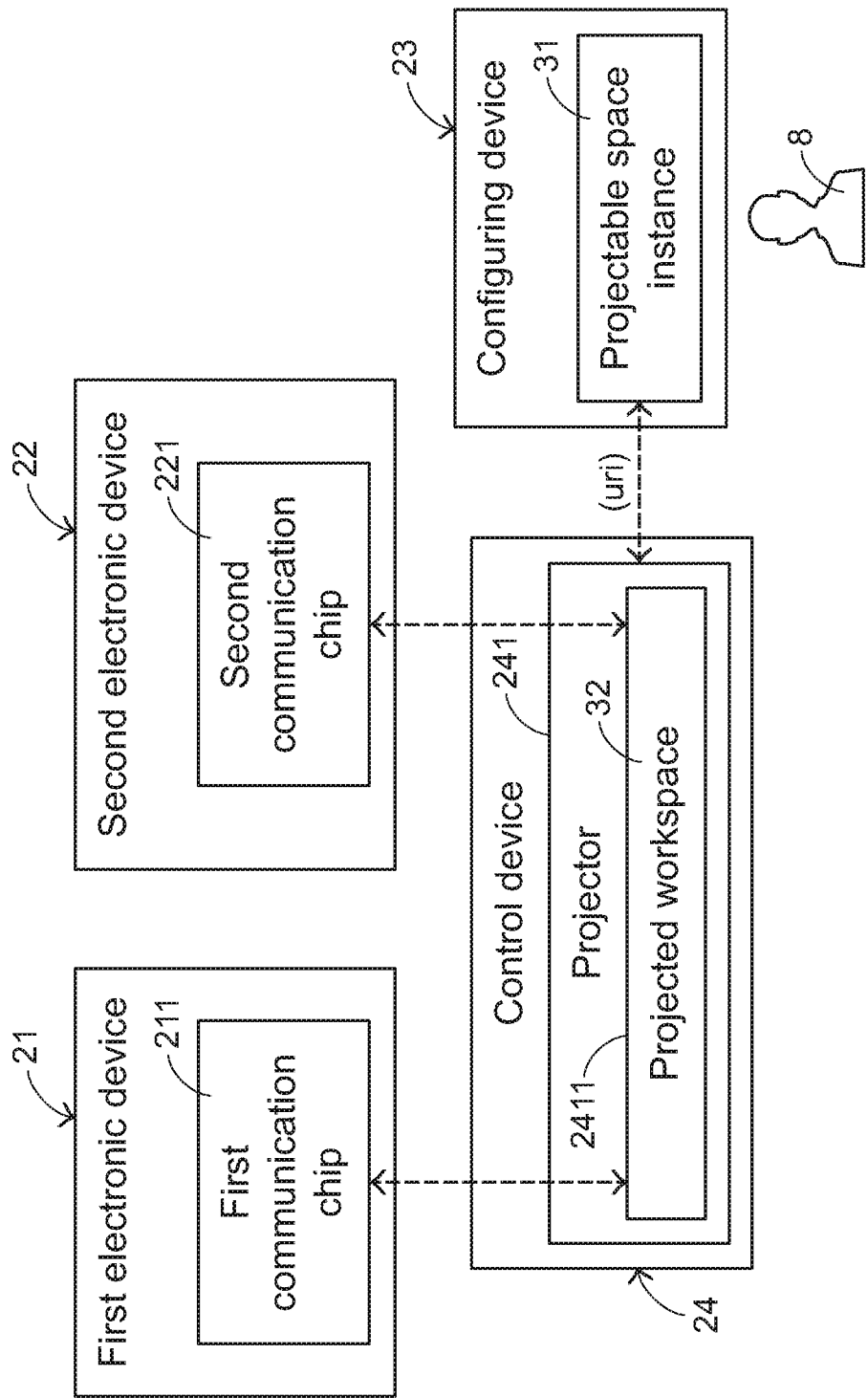
Figure 13:
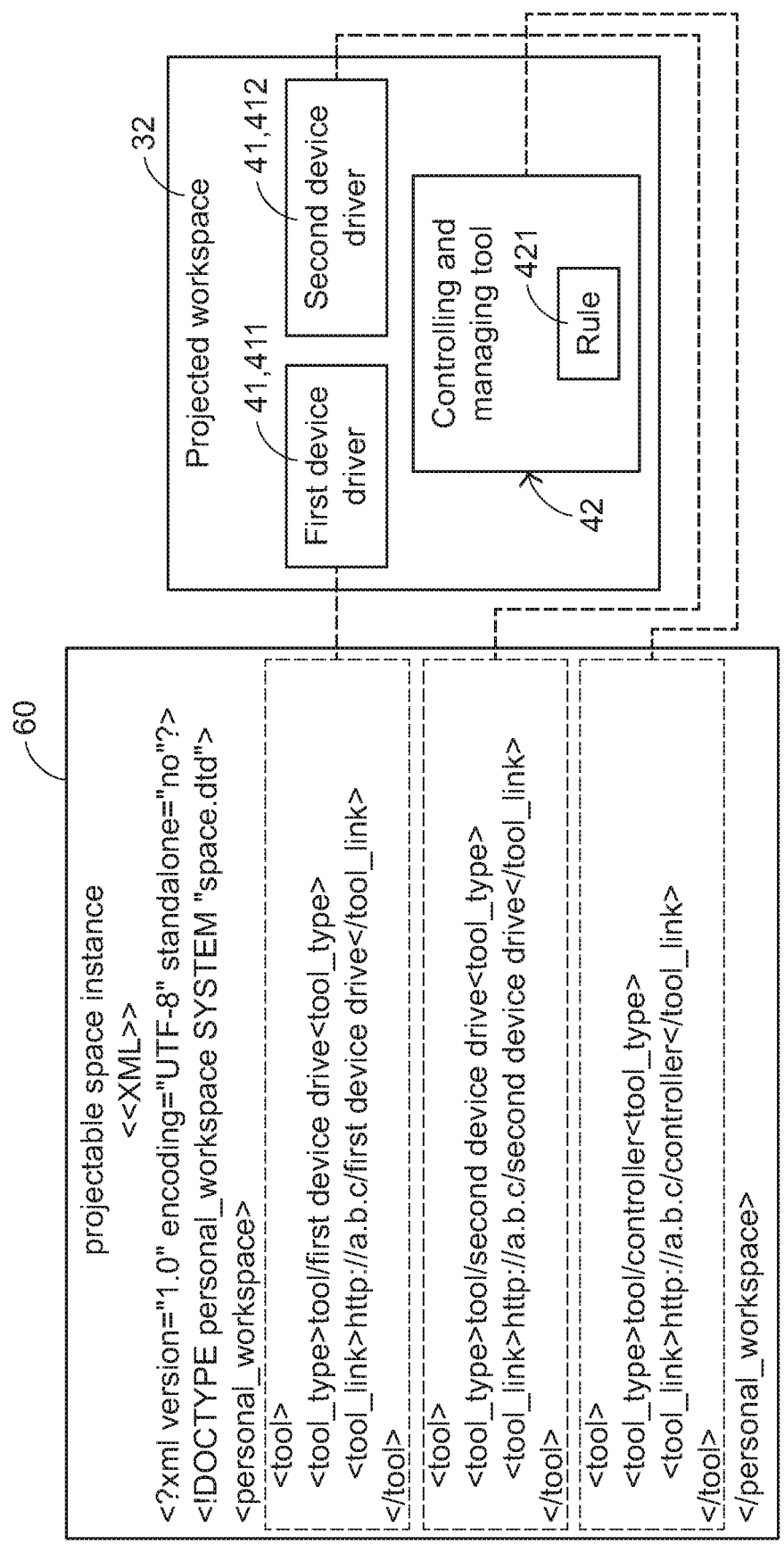
FIG. 13 is a schematic diagram exemplifying the relationship between a projectable space instance and a projected workspace involved in the method illustrated in FIGS. 11 and 12.

Please refer to FIG. 11 through FIG. 13. FIG. 11 schematically illustrating an initial state before a projected workspace is built. FIG. 12 schematically illustrates the progress of generating a projected workspace. FIG. 13 schematically shows the relationship between a projectable space instance as shown in FIGS. 11 and 12 and a projected workspace as shown in FIG. 13.

As shown in FIG. 11, there are a first electronic device 21, a second electronic device 22, a configuring device 23 and a control device 24 in an environment, and interconnected via, for example, the internet. A first communication chip 211 developed based on a first communication protocol and a second communication chip 221 developed based on a second communication protocol are installed in the first electronic device 21 and the second electronic device 22, respectively. The first communication protocol is different from the second communication protocol. The control device 24 is, for example but not limited to, a computer, a home appliance, a handheld electronic device or a wearable electronic device. The first communication chip 211 is developed based on, for example but not limited to, AllJoyn open software architecture and the second communication chip 221 is developed based on, for example but not limited to, a communication protocol of DLNA.

According to the present invention, the first electronic device 21 and the second electronic device 22 can interact with each other to execute a task, as desired by a user 8, under the group control and management of the control device 24. Initially, a projectable space instance 31 is installed in the configuring device 23, for example but not limited to, a computer, and the projectable space instance 31 is created and compiled according to practical needs of the user 8. The user 8 may selectively add a control and management tool 42 and a plurality of unified tools 41 respectively corresponding to the first electronic device 21 and the second electronic device 22 to the projectable space instance 31. The control and management tool 42 may be independent from or configured into one or more of the unified tools 41. In addition, the user 8 may compile a control rule 421 of the control and management tool 42 by way of the configuring device 23. When the projectable space instance 31 is loaded into the control device 24 via, for example but not limited to, a uniform resource identifier (URI), the control device 24 parses the projectable space instance 31 and builds a projected workspace 32 accordingly. Then the projected workspace 32 can be executed by the control device 24, whereby the first electronic device 21 and the second electronic device 22 interact with each other and execute a task according to the controlling rule 421.

More specifically, the projected workspace 32 is built by way of a projector 241 included in the control device 24. The projector 241 builds a working environment 2411 required for the operation of the projected workspace 32 in the control device 24. The projector 241 also provides a micro-kernel 2412 corresponding to the workspace for equipping and launching the control and management tool 42 and the unified tools 41 compiled in the projectable space instance 31. When the control device 24 loads the projectable space instance 31 thereinto from the configuring device 23, the projector 241 parses the projectable space instance 31, and then the projected workspace 32 is built in the working environment 2411 according to parsed contents of the projectable space instance 31. Accordingly, the first electronic device 21 and the second electronic device 22 interact with each other and execute a task according to the controlling rule 421 by way of the control and management tool 42. The projector 241 can be built in the control device 24. Alternatively, the projector 241 can also be loaded from an external storage device (not shown in the figures) via internet.

In this embodiment, the unified tools 41 includes a first device driver 411 and a second device driver 412 respectively corresponding to the first electronic device 21 and the second electronic device 22, and the projectable space instance 31 is an object which is instantiated with XML. As shown in FIG. 13, the relationship between the projectable space instance 31 and the projected workspace 32 are shown, and the correspondence is indicated with dash lines. In this embodiment, the first device driver 411 and the second device driver 412 are developed by way of, for example but not limited to, software development kits (SDK) respectively corresponding to the first electronic device 21 and the second electronic device 22, and held in a specified storage device linkable to the internet.

Figure 14:
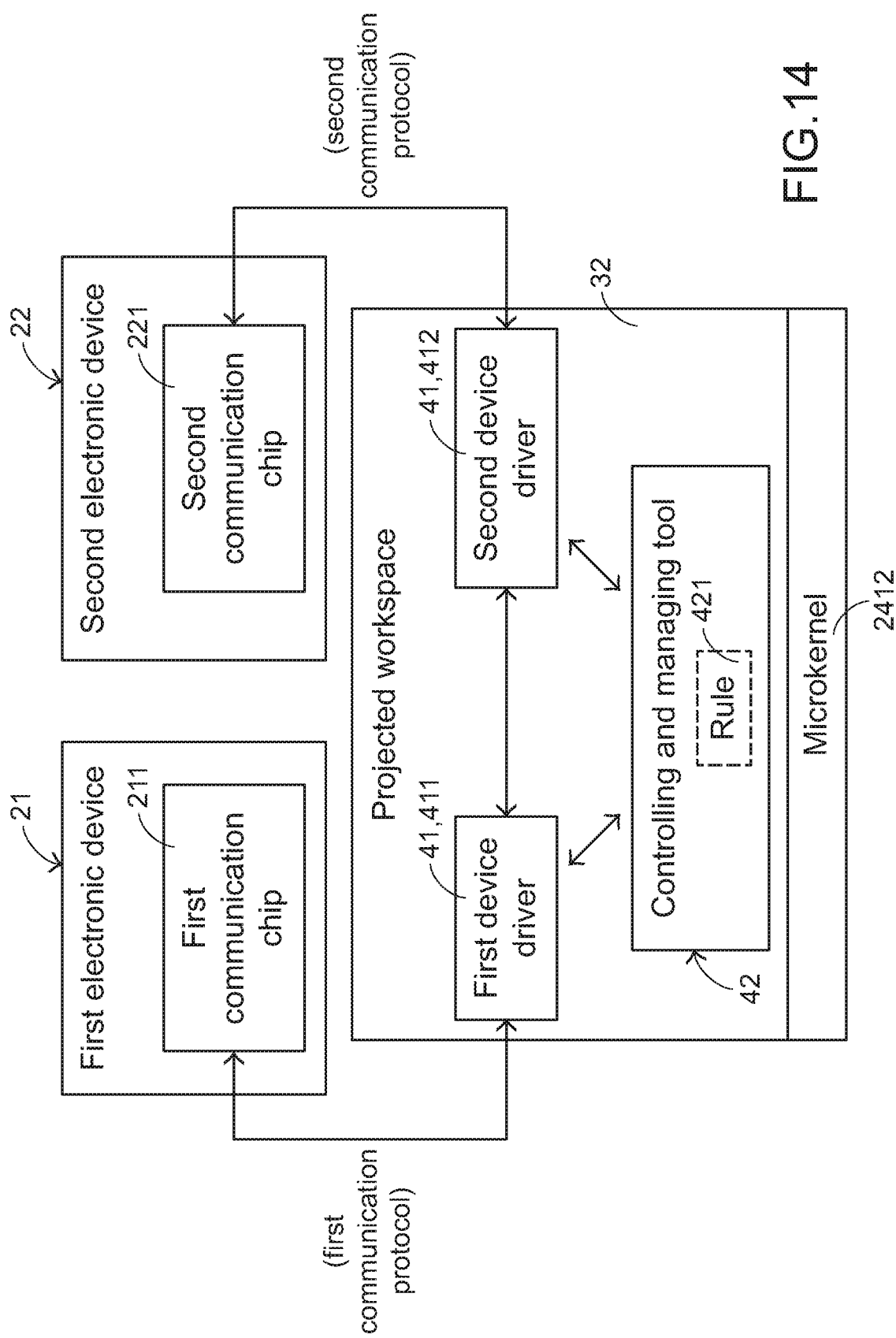
FIG. 14 is a scheme illustrating the interaction of the projected workspace in the control device with the first electronic device and the second electronic device for group control and management according to an embodiment of the present invention.

Please refer to FIG. 14, which is a scheme illustrating the interaction of the projected workspace in the control device with the first electronic device and the second electronic device for group control and management according to an embodiment of the present invention. In this embodiment, since the first device driver 411, the second device driver 412 and the control and management tool 42 configured into the projected workspace 32 during the creation of the projected workspace 32 are unified ones, the first device driver 411, the second device driver 412 and the tool of control and management 42 are compatible and communicable with one another. Therefore, the first communication chip 211 of the first electronic device 21 in communication with the first device driver 411 via the first communication protocol and the second communication chip 221 of the second electronic device 22 in communication with the second device driver 412 via the second communication protocol can interact with each other to execute a task.

For example, the first electronic device 21 is a home appliance, e.g. a water heater, using a battery as power supply. The second electronic device 22 is a home appliance, e.g. a television, having a display. The task to be executed is to show a warning notice on the second electronic device 22 before the battery of the first electronic device 21 is dead. For achieving this purpose, the group control and management method according to the present invention is used to make the first electronic device 21 and second electronic device 22 automatically create interconnection and interaction with each other via the control device 24.

In more detail, the user 8 compiles the projectable space instance 31 based on the requirement of the task to add the unified first device driver 411 corresponding to the first electronic device 21, the unified second device driver 412 corresponding to the second electronic device 22 and the control and management tool 42 into the projectable space instance 31. The control and management tool 42 in this example is a notifying tool, and the control rule 421 is compiled to express that the control and management tool 42, if detecting that the battery level of the first electronic device 21 is lower than a preset value via the unified first device driver 411, drives the second electronic device 22 to display the warning notice via the second device driver 412. In other words, by building the projected workspace 32 in the control device 24, desired group control and management can be performed by the control device 24 to accomplish the task.

According to the above descriptions, it is understood that the present invention provides a method of group control and management among home appliances adopting different communication protocols or communication chips for collaboration. The user can also compile the control rule about the collaboration of the home appliances in the group control and management method as desired in order to comply with the lifestyle and habits of the user. Furthermore, when a new communication protocol is created, the group control and management method according to the present invention allows the user to configure a unified tool, e.g. a device driver, according to the new communication protocol in the control device. Hence the home appliance using the new communication protocol, once added into the existing home appliance environment, can interact with other home appliances. That is, there is no need for the user to search or buy a control device compiled with all communication protocols, including new communication protocols adopted by new home appliances, and the user need not worry if the developers will continue to develop a control device compiled with updated communication protocols.

The above-mentioned embodiments can be varied or modified according to practical needs. For instance, the control device and the configuring device can be integrated into one unit. Furthermore, the control and management tool can be installed in the first device driver or the second device driver. As for the task to be executed by the second electronic device, in addition to displaying a warning message, processing or operating the status information realized from the first electronic device may also be executed by the second electronic device for a specific purpose or to achieve a desired effect.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of group control and management among electronic devices, the electronic devices being in communication with a control device, the method comprising:
providing a projectable space instance to the control device for creating a workspace, wherein a control and management tool and a plurality of unified tools for driving respective electronic devices are selectively added to the projectable space instance; and
parsing the projectable space instance using a projector included in the control device to automatically generate a projected workspace, the projected workspace being generated in the projector and corresponding to the workspace to be created via the projectable space instance, wherein the control and management tool realizes at least one status information of at least a first one of the electronic devices by way of the unified tools, and controls at least a second one of the electronic devices to execute at least one task corresponding to the at least one status information.

2. The method according to claim 1, wherein the control and management tool is a notifying tool, which realizes and transmits status information of the first electronic device to the second electronic device to have the status information displayed, processed and/or operated by the second electronic device.

3. The method according to claim 1, wherein the unified tools include a first device driver and a second device driver specific to the first electronic device and the second electronic device, respectively, and the control and management tool detects the at least one status information of the first electronic device via the first device driver, and drives the second electronic device to execute the at least one task corresponding to the at least one status information via the second device driver.

4. The method according to claim 1, wherein the unified tools are obtained by unifying device drivers specific to the electronic devices, respectively, wherein each of the device drivers is used for communicating a corresponding one of the electronic devices with the control and management tool.

5. The method according to claim 4, wherein at least one of the device drivers is developed by way of a software development kit.

6. The method according to claim 4, wherein the device drivers are configured into the projected workspace after being unified in order to be compatible with one another.

7. The method according to claim 1, wherein the control and management tool is configured into at least one of the unified tools.

8. The method according to claim 1, wherein the first electronic device and the second electronic device are different types of electronic devices.

9. The method according to claim 1, wherein the first electronic device and the second electronic device are manufactured by different manufacturers, exhibit different functions, or are manufactured by different manufacturers and exhibit different functions.

10. The method according to claim 1, for group controlling and managing a home appliance system, a medical equipment system, a security control system, a fire-fighting control system or a transportation control system.

11. The method according to claim 1, wherein the control device is a computer, a home appliance, a handheld electronic device, or a wearable electronic device.

12. The method according to claim 1, wherein the projectable space instance is an object, an XML document, or an instance which is instantiated with a structured language or a structured protocol.

* * * * *